(12) United States Patent
Lee et al.

(10) Patent No.: US 11,719,131 B2
(45) Date of Patent: Aug. 8, 2023

(54) EXHAUST DIFFUSER STRUT FOR REDUCING FLOW SEPARATION

(71) Applicant: DOOSAN ENERBILITY CO., LTD, Changwon (KR)

(72) Inventors: Ik Sang Lee, Seoul (KR); Willy Hofmann, Zelgweg (CH)

(73) Assignee: DOOSAN ENERBILITY CO., LTD., Changwon (KR)

( * ) Notice: Subject to any disclaimer, the term of this patent is extended or adjusted under 35 U.S.C. 154(b) by 194 days.

(21) Appl. No.: 17/192,827

(22) Filed: Mar. 4, 2021

(65) Prior Publication Data

US 2021/0277804 A1 Sep. 9, 2021

(30) Foreign Application Priority Data

Mar. 5, 2020 (KR) .......................... 10-2020-0027608

(51) Int. Cl.
| | | |
|---|---|---|
| F01D 25/28 | (2006.01) | |
| F01D 9/04 | (2006.01) | |
| F01D 25/30 | (2006.01) | |
| F01D 9/02 | (2006.01) | |

(52) U.S. Cl.
CPC .............. *F01D 25/28* (2013.01); *F01D 9/02* (2013.01); *F01D 9/041* (2013.01); *F01D 25/30* (2013.01); *F05D 2240/122* (2013.01)

(58) Field of Classification Search
CPC .......... F01D 25/28; F01D 9/041; F01D 5/141; F01D 5/148; F05D 2240/12; F05D 2220/32; F05D 2240/122
See application file for complete search history.

(56) References Cited

U.S. PATENT DOCUMENTS

| | | | | |
|---|---|---|---|---|
| 3,572,962 A | * | 3/1971 | Embleton | ............... F01D 5/142 416/235 |
| 8,061,983 B1 | * | 11/2011 | Bowers | .................... F01D 25/30 415/211.2 |
| 10,047,636 B2 | * | 8/2018 | Akturk | ..................... F01D 5/143 |
| 10,392,975 B2 | * | 8/2019 | Nanda | ........................ F01D 25/24 |
| 2005/0106030 A1 | * | 5/2005 | Bachofner | ............ F04D 29/668 416/235 |
| 2016/0290169 A1 | * | 10/2016 | Karafillis | ............... F01D 25/246 |
| 2018/0023396 A1 | * | 1/2018 | Narrow | ..................... F01D 5/20 60/805 |

FOREIGN PATENT DOCUMENTS

| | | | | |
|---|---|---|---|---|
| CN | 106050314 A | 10/2016 | | |
| EP | 3715585 A1 | 9/2020 | | |
| JP | 2015200211 A | 11/2015 | | |
| JP | 2016194297 A | 11/2016 | | |
| JP | 6409072 B2 | 10/2018 | | |
| JP | 02245428 A | 2/2019 | | |
| WO | WO-2010004216 A1 | * | 1/2010 | ............. B29B 11/16 |
| WO | 2019027661 A1 | 2/2019 | | |

OTHER PUBLICATIONS

English Translation of Chinese Office action from Nov. 2022. (Year: 2022).*
Search Report issued by European Patent Office.

* cited by examiner

*Primary Examiner* — Brian Christopher Delrue
(74) *Attorney, Agent, or Firm* — Harvest IP Law, LLP (57) ABSTRACT

A strut provided in an exhaust diffuser and having an airfoil-shaped cross-section is provided. The strut may include a cut portion configured to be formed in a trailing edge in a span direction. The cut portion is configured to provide a stepped portion in at least a portion of the trailing edge.

8 Claims, 8 Drawing Sheets

Related Art

EXHAUST DIFFUSER STRUT FOR REDUCING FLOW SEPARATION

CROSS REFERENCE TO RELATED APPLICATION

This application claims priority to Korean Patent Application No. 10-2020-0027608, filed on Mar. 5, 2020, the disclosure of which is incorporated herein by reference in its entirety.

FIELD

Apparatuses and methods consistent with exemplary embodiments relate to an exhaust diffuser strut and, more particularly, to an exhaust diffuser strut configured to reduce pressure loss in an exhaust diffuser by reducing flow separation occurring in a trailing edge thereof.

BACKGROUND

A gas turbine includes a compressor, a combustor, and a turbine. The compressor compresses air by a plurality of compressor blades to generate compressed air which is in a high-temperature and high-pressure state. The combustor mixes fuel with the compressed air supplied from the compressor and burns a mixture thereof by a burner to generate high-temperature and high-pressure combustion gas which is discharged to the turbine. The turbine includes a plurality of turbine blades rotated by the combustion gas, thereby generating power. The generated power is used in various fields, such as generating electric power and driving machines. For example, the gas turbine is used for driving a power generator, an aircraft, a locomotive, or the like.

After rotating the turbine blades, the combustion gas may be exhausted to outside through an exhaust diffuser located on the turbine. In order to form an annular exhaust space of the exhaust diffuser, a conical hub and a conical casing located outside the conical hub are necessary, and a strut connecting and supporting the conical hub and the conical casing is radially provided.

Here, the strut has an airfoil-shaped cross-section in order to interrupt the flow of the combustion gas to a minimum extent. A trailing edge downstream of the combustion gas forms a boundary layer downstream thereof as the flow of the combustion gas leaves. This may cause flow separation, thereby causing pressure loss inside the exhaust diffuser. The pressure loss inside the exhaust diffuser may degrade the efficiency of exhaust and have an adverse effect to the efficiency of a complex power generation system provided by connecting a heat recovery system generator (HRSG) and a steam turbine to a gas turbine.

BRIEF DESCRIPTION

Aspects of one or more exemplary embodiments provide a novel exhaust diffuser strut configured to reduce pressure loss inside an exhaust diffuser that is caused by flow separation occurring in a trailing edge thereof.

Additional aspects will be set forth in part in the description which follows and, in part, will become apparent from the description, or may be learned by practice of the exemplary embodiments.

According to an aspect of an exemplary embodiment, there is provided a strut provided in an exhaust diffuser and having an airfoil-shaped cross-section. The strut may include a cut portion configured to be formed in a trailing edge in a span direction. The cut portion may provide a stepped portion in at least a portion of the trailing edge.

The cut portion may begin from a radial external end of the strut.

A length of the cut portion may be at least 15% of a span length.

The cut portion may be provided on an entire trailing edge of the strut.

Ribs may be provided along both boundaries between the cut portion and a wing-shaped surface of an airfoil, respectively.

The ribs may extend along a wing-shaped curved surface of the airfoil.

Corresponding ends of a pair of ribs may be spaced apart from each other.

The cut portion and the ribs may be provided on an entire trailing edge of the strut, and lattice-shaped reinforcement ribs may be provided on a surface of the cut portion.

An end of a transverse rib of the reinforcement ribs may be in contact with or bonded to the ribs.

A depth of the cut portion may range from 10% to 30% of a chord length.

According to an aspect of another exemplary embodiment, there is provided an exhaust diffuser including: a cylindrical hub; a conical casing provided outside and concentric with the cylindrical hub; and a strut configured to connect and support the cylindrical hub and the conical casing. The strut may include a cut portion configured to be formed in a trailing edge in a span direction. The cut portion may provide a stepped portion in at least a portion of the trailing edge.

The exhaust diffuser strut having the above-described configuration according to the exemplary embodiments may cause a significant change in a flow of combustion gas due to the cut portion in which the stepped portion is formed on at least a portion of the trailing edge, and delay the formation of a boundary layer in the combustion gas disturbed by an abrupt change in the flow. As the delayed formation and development of the boundary layer of the combustion gas, the occurrence of flow separation in the edge area is also delayed and the extinction of flow separation is accelerated. Accordingly, the exhaust diffuser strut according to the exemplary embodiments may reduce pressure loss inside the exhaust diffuser by reducing the occurrence of the flow separation, thereby improving the exhaust efficiency.

BRIEF DESCRIPTION OF THE DRAWINGS

The above and other aspects will be more apparent from the following description of the exemplary embodiments with reference to the accompanying drawings, in which.

DETAILED DESCRIPTION

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. When terms, such as "on" and "over", are used herein to refer to layers, areas, patterns, or structures, it should be understood that a layer, area, pattern, or structure may be located above another layer, area, pattern, or structure directly or indirectly via an intervening layer, area, pattern, or structure. When terms, such as "under" and "below", are used herein to refer to layers, areas, patterns, or structures, it should be understood that a layer, area, pattern, or structure may be located below another layer, area, pattern, or structure directly or indirectly via an intervening layer, area, pattern, or structure. In the disclosure, terms such as "includes," "comprises," and "have/has" should be construed as designating that there are such features, integers, steps, operations, elements, components, and/or combinations thereof, not to exclude the presence or possibility of adding of one or more of other features, integers, steps, operations, elements, components, and/or combinations thereof.

In addition, unless otherwise specified, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, exemplary embodiments will be described in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 1:
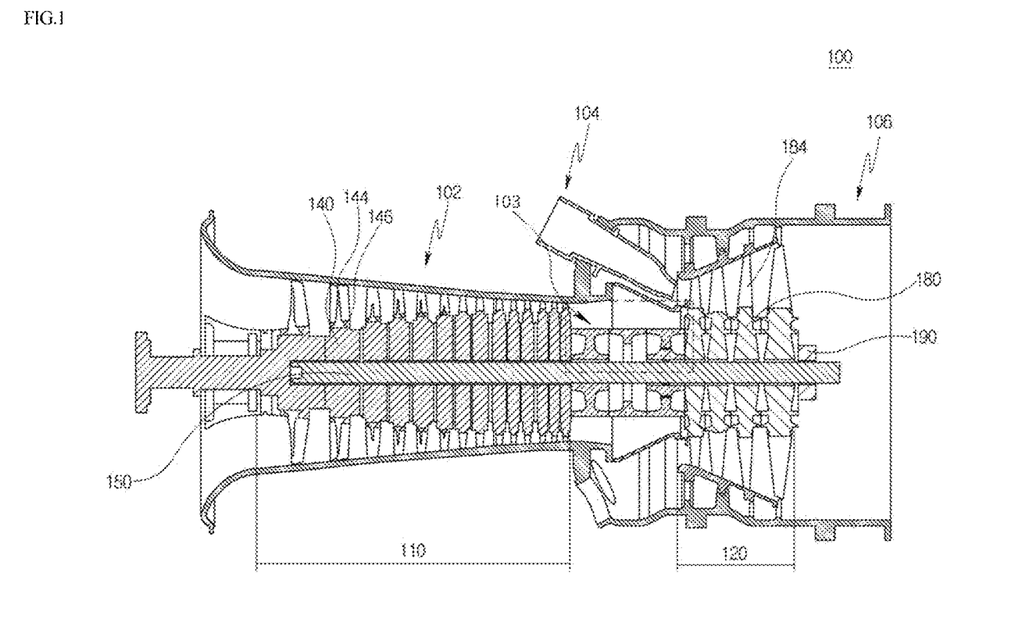
FIG. 1 is a view illustrating an example of a gas turbine to which an exhaust diffuser according to an exemplary embodiment is applied.

FIG. 1 is a cross-sectional view illustrating a gas turbine according to an exemplary embodiment. Referring to FIG. 1, a gas turbine 100 according to an exemplary embodiment includes a compressor 110, a combustor 104, a turbine 120, a housing 102, and an exhaust diffuser 106.

The housing 102 covers the compressor 110 which compresses an introduced air at high pressure and delivers the compressed air to the combustor 104. The combustor 104 generates high-temperature and high-pressure combustion gas using a mixture of the compressed air and fuel and supplies the combustion gas to the turbine 120. The turbine 120 generates rotational torque using the combustion gas supplied from the combustor 104. The exhaust diffuser 106 is located at a rear of the turbine 120 to broaden (or expand) the high temperature combustion gas and reduce the speed thereof. The gas turbine 100 further includes a torque tube 130 between the compressor 110 and the turbine 120 in order to transfer the rotational torque generated by the turbine 120 to the compressor 110.

The compressor 110 includes a plurality of compressor blades 144 radially arranged on a plurality of compressor rotor disks 140. Each of the plurality of compressor blades 144 includes a compressor blade root 146 having a shape of a dovetail or a fir tree and configured to be coupled to corresponding one of the compressor rotor disks 140. The compressor 110 rotates the plurality of compressor blades 144, and air is compressed and moved to the combustor 104 by the rotation of the plurality of compressor blades 144. Here, the compressor 110 is directly or indirectly connected to the turbine 120 to receive a portion of power generated by the turbine 120. The received power is used to rotate the plurality of compressor blades 144.

Air compressed by the compressor 110 is moved to the combustor 104. The combustor 104 includes a plurality of casings and a plurality of burners arranged in a circular pattern. The combustor 104 includes a combustion chamber including a liner. Fuel provided through a fuel nozzle is provided to the combustion chamber of the combustor 104. The combustor 104 mixes the compressed air with the fuel and burns the mixture in the combustion chamber to generate high-temperature and high-pressure combustion gas which is discharged to the turbine 120, thereby rotating turbine blades 184 attached to turbine rotor disks 180.

The gas turbine 100 further includes a tie rod 150 extending through the compressor rotor disks 140 and the turbine rotor disks 180. One end of the tie rod 150 is attached to the compressor rotor disk 140 that is disposed at the most upstream side, and the other end thereof is fixed by a fixing nut 190. Here, adjacent compressor rotor disks 140 are arranged so that facing surfaces thereof are in tight contact with each other by the tie rod 150, so that the adjacent compressor rotor disks 140 do not rotate relative to each other. A plurality of compressor vanes are fixedly arranged between each of the compressor rotor disks 140. While the compressor rotor disks 140 rotate along with a rotation of the tie rod 150, the compressor vanes attached to the housing 102 do not rotate. The compressor vanes guide the flow of compressed air moved from front-stage compressor blades 144 of the compressor rotor disk 140 to rear-stage compressor blades 144 of the compressor rotor disk 140.

The turbine 120 basically has a structure similar to that of the compressor 110. That is, the turbine 120 includes a plurality of turbine blades 184 coupled to the plurality of turbine rotor disks 180 and the turbine rotor disks 180 similar to the compressor rotor disks 140 of the compressor 110. Each turbine rotor disk 180 includes the plurality of turbine blades 184 which are radially disposed on the turbine rotor disks 180. The plurality of turbine blades 184 may be assembled to the turbine rotor disks 180 via a dovetail joint or a fir joint. In addition, turbine vanes fixed to the housing are provided between the turbine blades 184 of the turbine rotor disk 180 to guide a flow direction of combustion gas passing through the turbine blades 184.

The high temperature combustion gas passes through the turbine 120 along the axial direction and rotates the turbine blades 184. For example, after rotating the turbine blades 184, the combustion gas may be exhausted to the outside through an exhaust diffuser 106 located at the rear of the turbine 120. That is, the exhaust diffuser 106 receives the exhaust gas from the turbine 120 and discharges the exhaust gas from the gas turbine 100. Here, the combustion gas exhausted through the exhaust diffuser 106 is also referred to as exhaust gas.

Figure 2:
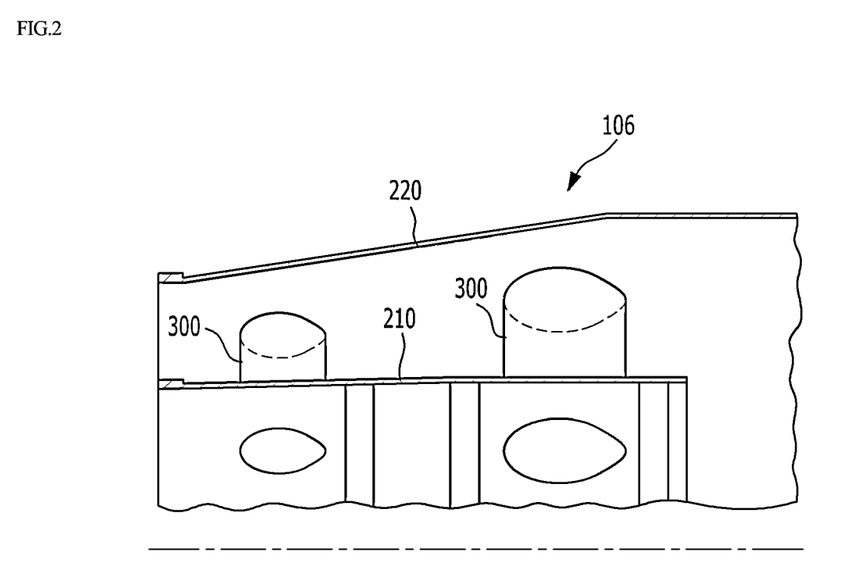
FIG. 2 is a view schematically illustrating a structure of the exhaust diffuser according to an exemplary embodiment.

FIG. 2 is a view schematically illustrating a structure of the exhaust diffuser 106 located at the rear of the turbine 120 according to an exemplary embodiment. Referring to FIG. 2, the exhaust diffuser 106 is configured such that a cylindrical hub 210 located inside and a conical casing 220 located outside are arranged concentrically, thereby forming an annular space through which combustion gas is exhausted. The conical casing 220 is large in size, extends long to the rear of the turbine 120, and has a relatively thin thickness. Due to these features, vibration may be caused by a flow of combustion gas, so the conical casing is not structurally durable. For this reason, the casing 220 has a support structure in which the casing 220 is connected to and supported by a strut 300 with respect to the cylindrical hub 210.

Figure 3:
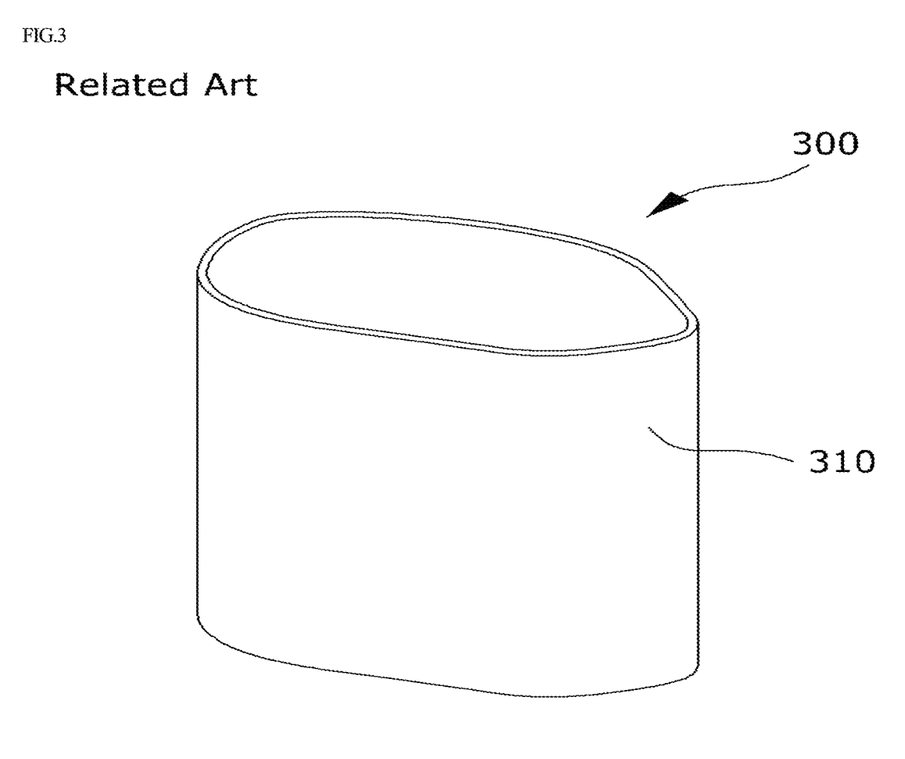
FIG. 3 is a view illustrating a structure of a related-art strut.

Because the strut 300 intersects a path through which the combustion gas flows, the strut 300 has an airfoil-shaped cross-section to minimize the flow of the combustion gas. FIG. 3 is a view illustrating a structure of a related-art strut. Because the strut 300 has the airfoil-shaped cross-section, a thinnest trailing edge 310 is located downstream of the combustion gas. Flows of combustion gas passing along both surfaces of the strut 300 are combined with each other while passing over the trailing edge 310. As a boundary layer is gradually formed at a location near the trailing edge 310, flow separation begins to occur.

The flow separation causes an internal pressure loss in the exhaust diffuser 106, and this pressure loss inside the exhaust diffuser 106 reduces the exhaust efficiency. In addition, the exhaust efficiency of the gas turbine 100 is deteriorated, and the efficiency of an entire complex power generation system provided by connecting a heat recovery apparatus and a steam turbine to the gas turbine is adversely affected.

Figure 4:
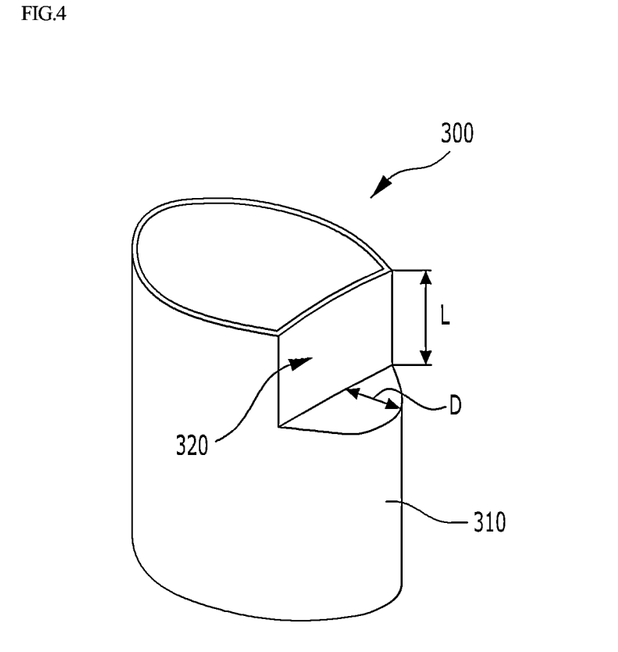
FIG. 4 is a view illustrating a strut according to an exemplary embodiment.

FIG. 4 is a view illustrating a strut according to an exemplary embodiment. For example, it illustrates an exemplary embodiment for effectively suppressing the effect of flow separation occurring in the area of the trailing edge 310 of the strut 300. Referring to FIG. 4, the trailing edge 310 of the strut 300 includes a cut portion 320 provided in the span direction. The cut portion 320 forms a stepped portion on at least a portion of the trailing edge 310.

The cut portion 320 of the trailing edge 310 causes a significant change in a flow of the combustion gas. When the combustion gas flowing through the surface of the airfoil of the strut 300 meets the cut portion 320, the combustion gas flows into the cut portion 320 along a sharp curved path to generate a large turbulence. If the combustion gas is disturbed by turbulence, the formation of a boundary layer is delayed. As the formation of the boundary layer is delayed, the occurrence of flow separation in the area of the trailing edge 310 is also delayed and an extinction of flow separation is accelerated. Thus, the cut portion 320 formed on the trailing edge 310 reduces pressure loss inside the exhaust diffuser 106.

Figure 6:
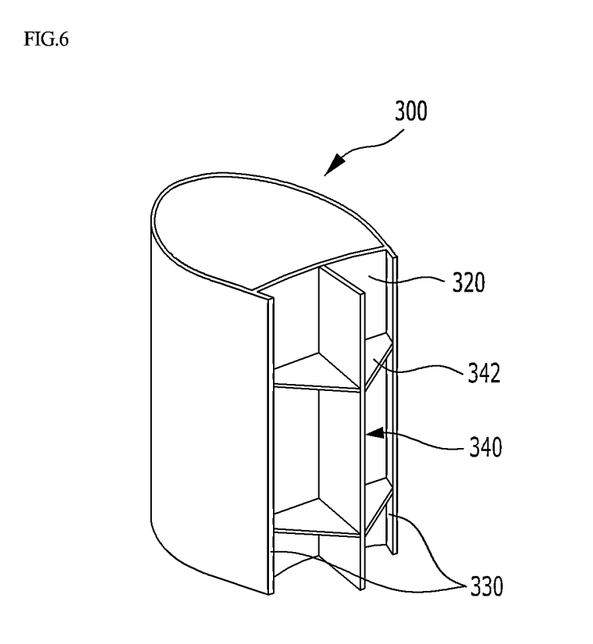
FIG. 6 is a view illustrating a strut according to another exemplary embodiment.

The cut portion 320 is provided on at least a portion of the trailing edge 310 in the span direction. That is, the cut portion 320 may be formed on a portion of the trailing edge 310 as illustrated in FIG. 4 or on an entire portion of the trailing edge 310 as illustrated in FIG. 6. When the cut portion 320 is formed in a portion of the trailing edge 310, it may be effective to properly design a position and a minimum length L of the cut portion 320 in consideration of the flow of the combustion gas. Observing the flow of the combustion gas passing through the strut 300, the flowing angle increases from the hub 210 to the casing 220 at about 80% or more of the span in the span direction. Thus, the combustion gas does not flow along the surface of the strut 300, resulting in flow separation. Accordingly, the cut portion 320 may start from a radially outer end of the strut 300 adjacent to the casing 220, and for example, the length L of the cut portion 320 may be at least 15% of the span length.

Figure 5:
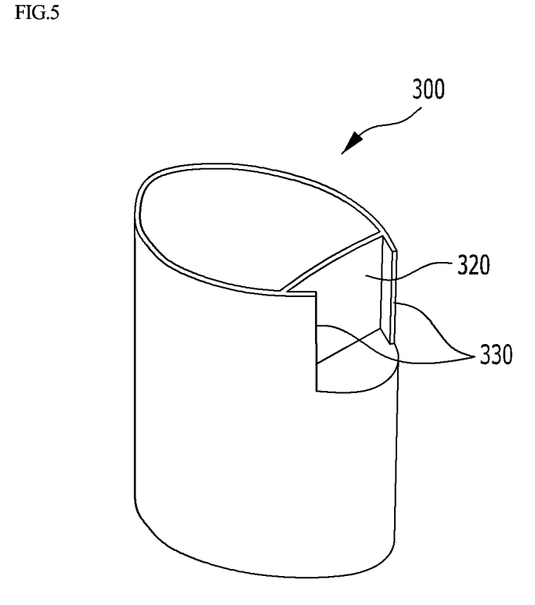
FIG. 5 is a view illustrating a strut according to another exemplary embodiment.

FIG. 5 is a view illustrating a strut according to another exemplary embodiment, and FIG. 6 is a view illustrating a strut according to still another exemplary embodiment. Referring to FIG. 5, ribs 330 are provided along both boundaries between the cut portion 320 and the wing-shaped surface of the airfoil, respectively. The ribs 330 form stepped-portions to the flow of the combustion gas toward the cut portion 320. The combustion gas flowing over the ribs 330 flows toward the cut portion 320 along a sharp curved path. Thus, the ribs 330 may be effective to create an action that delays the formation of the boundary layer.

In addition, in consideration of the flow of the combustion gas along the surface of the airfoil, the ribs 330 may protrude in a direction in which the ribs 330 extend along the wing-shaped curved surface of the surface of the airfoil. Even when the ribs 330 are formed, corresponding ends of the pair of ribs 330 are spaced apart from each other, because the surface of the cut portion 320 must be exposed to the flow of the combustion gas.

Referring to FIG. 6, the strut 300 includes the cut portion 320 and the ribs 330 formed on an entire portion of the trailing edge 310. Here, the structural strength of the strut 300 may be reduced, because the entire trailing edge 310 is cut along the span direction. In order to reinforce the reduced structural strength, reinforcement ribs 340 in a form of a lattice may be provided on the surface of the cut portion 320, as shown in FIG. 6.

If the ribs 340 are formed on peripheral portions of the cut portion 320, the effect of the structural reinforcement of the reinforcement ribs 340 may be further increased by bringing ends of horizontal ribs 342 of the reinforcement ribs 340 into contact with or coupled to the ribs 330 or bonding the same.

In addition, it may be necessary to consider a depth D of the cut portion 320, that is, how deep the cut portion 320 will be located in the strut 300. Because the cut portion 320 serves to reduce the flow separation, it may be necessary to properly determine the depth D of the cut portion 320 in consideration of the flow separation. For example, because the stepped portion of the cut portion 320 causes a significant change in the flow of the combustion gas, the cut portion 320 having an excessive depth may adversely affect the overall aerodynamic performance of the strut 300. In general, the flow separation begins in the range of 10% to 30% of a reference chord length of the trailing edge 310. Therefore, in consideration of this feature, it is appropriate to limit the depth D of the cut portion 320 within the range of 10% to 30% of the chord length.

TABLE 1

|  | FIG. 3 | FIG. 4 | FIG. 5 | FIG. 6 |
|---|---|---|---|---|
| Cp | 0.839 | 0.848 | 0.842 | 0.844 |
| Press. Loss | 2.19 | 2.14 | 2.21 | 2.14 |

Table 1 described above compares the flow performance of the related-art strut 300 illustrated in FIG. 3 with the strut 300 according to the exemplary embodiments illustrated in FIGS. 4 to 6. Here, Cp is a dimensionless coefficient of pressure recovery (i.e. a ratio of dynamic pressure to static pressure). The faster the pressure recovery, i.e., the higher the Cp value, the more advantageous the exhaust efficiency. The pressure loss refers to a pressure drop in combustion gas occurring while passing through the strut 300. The lower the pressure loss, the higher the exhaust efficiency. Referring to Table 1, it may be appreciated that the pressure recovery of each of the three exemplary embodiments is superior to that of the related-art strut 300, and that the pressure loss is also improved except for the slight increase in the example of FIG. 5 in which the partial cut portion 320 and the ribs 330 are combined. In other words, on a quantitative basis, the strut 300 including the cut portion 320 according to the exemplary embodiments is obviously more effective in reducing the occurrence of flow separation than the related-art strut 300 illustrated in FIG. 3. In particular, the exemplary embodiments illustrated in FIGS. 4 and 6 resulted in significant improvements in both aspects of pressure recovery and pressure loss.

Figure 7:
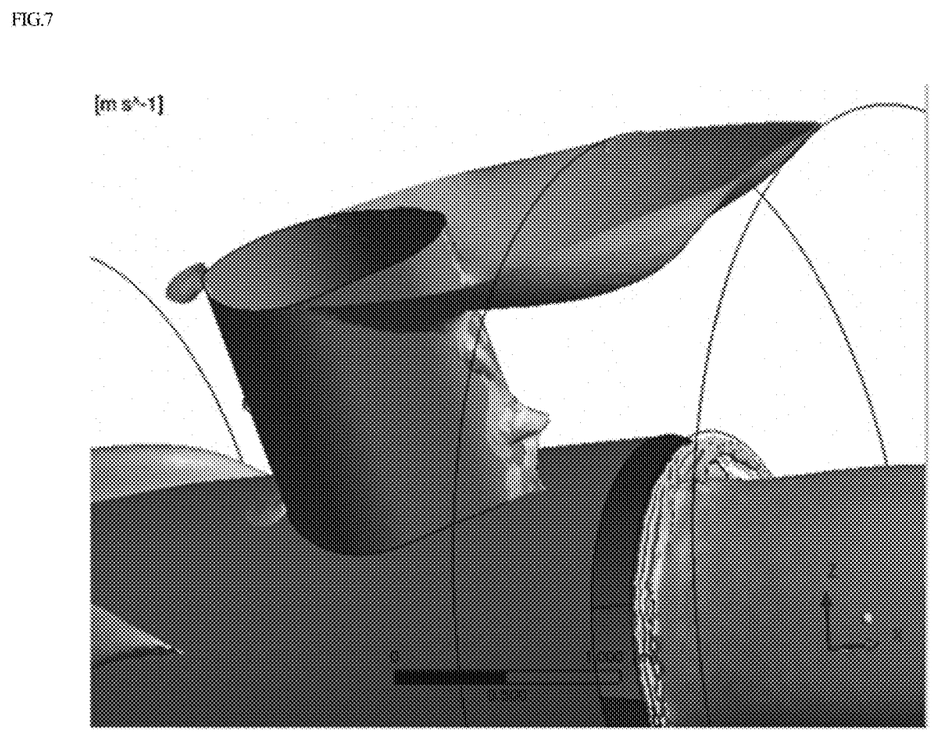
FIG. 7 is a view illustrating a result of computational analysis performed on combustion gas passing through the strut illustrated in FIG. 3.
Figure 8:
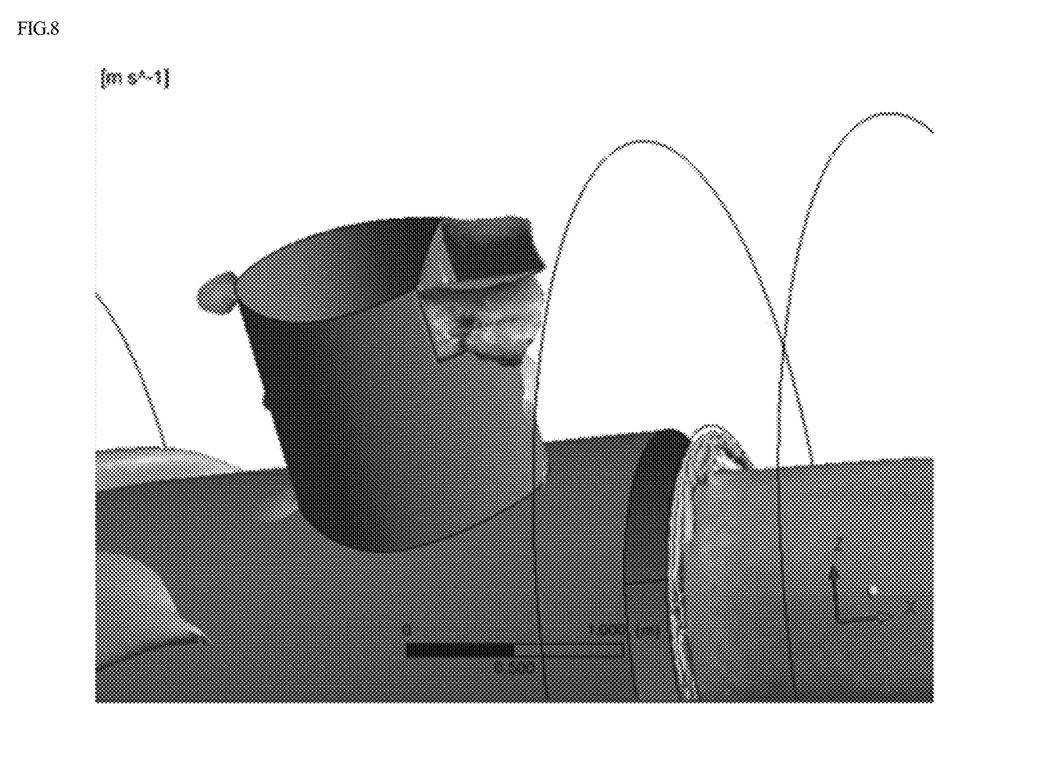
FIG. 8 is a view illustrating a result of computational analysis performed on combustion gas passing through the strut illustrated in FIG. 4.

FIG. 7 is a view illustrating a result of computational analysis performed on combustion gas passing through the related-art strut 300 illustrated in FIG. 3, and FIG. 8 is a view illustrating a result of computational analysis performed on combustion gas passing through the strut 300 having the partial cut portion 320 illustrated in FIG. 4. Comparing FIGS. 7 and 8, it may be seen that a recirculation flow is formed in an inner area of the cut portion 320 in the strut 300 according to the exemplary embodiments, thereby significantly improving the length of flow separation. This result of computational analysis may be evaluated to be consistent with the result of computational analysis shown in Table 1, in which the strut 300 including the partial cut portion 320 according to the exemplary embodiments is improved in both the pressure recovery and the pressure loss than the related-art strut.

As described above, the strut 300 according to the exemplary embodiments may effectively reduce flow separation occurring in the area of the trailing edge 310. Based on this, the exhaust diffuser 106 including the cut portion 320 in which the stepped portion is formed on at least one portion of the trailing edge 310 of the strut 300 along the span direction thereof, is provided. The exhaust diffuser 106 includes the inner cylindrical hub 210, the outer conical casing 220 disposed concentrically with the cylindrical hub 210, and the strut 300 connecting and supporting the casing 220.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A strut provided in an exhaust diffuser, the strut comprising:
   an airfoil,
   a cut portion configured to be formed in a portion of a trailing edge of the airfoil in a span direction of the strut,
   wherein the cut portion starts from a radially outer end of the trailing edge of the airfoil and provides a stepped surface that is oriented to face a radial outer direction of the strut.

2. The strut of claim 1, wherein the cut portion begins from a radial external end of the strut.

3. The strut of claim 2, wherein a length of the cut portion is at least 15% of a span length.

4. The strut of claim 2, wherein a depth of the cut portion ranges from 10% to 30% of a chord length.

5. An exhaust diffuser comprising:
   a cylindrical hub;
   a conical casing provided outside and concentric with the cylindrical hub; and
   a strut, having an airfoil, configured to connect and support the cylindrical hub and the conical casing,
   wherein the strut comprises a cut portion configured to be formed in a portion of a trailing edge in a span direction of the airfoil, and the cut portion starts from a radially outer end of the trailing edge of the airfoil and provides a stepped surface that is oriented to face the conical casing.

6. The exhaust diffuser of claim 5, wherein the cut portion is located adjacent to the conical casing and begins from a radial external end of the strut.

7. The exhaust diffuser of claim 6, wherein a length of the cut portion is at least 15% of a span length.

8. The exhaust diffuser of claim 6, wherein a depth of the cut portion ranges from 10% to 30% of a chord length.

* * * * *